(12) United States Patent
Weyerhaeuser et al.

(10) Patent No.: US 10,255,316 B2
(45) Date of Patent: Apr. 9, 2019

(54) PROCESSING OF DATA CHUNKS USING A DATABASE CALCULATION ENGINE

(71) Applicant: SAP SE, Walldorf (DE)

(72) Inventors: Christoph Weyerhaeuser, Heidelberg (DE); Alena Bakulina, Mannheim (DE); Tobias Mindnich, Sulzbach (DE); Johannes Merx, Heidelberg (DE); Julian Schwing, Mannheim (DE)

(73) Assignee: SAP SE, Walldorf (DE)

( * ) Notice: Subject to any disclaimer, the term of this patent is extended or adjusted under 35 U.S.C. 154(b) by 519 days.

(21) Appl. No.: 14/945,339

(22) Filed: Nov. 18, 2015

(65) Prior Publication Data

US 2017/0139982 A1 May 18, 2017

(51) Int. Cl.
*G06F 17/30* (2006.01)

(52) U.S. Cl.
CPC .. *G06F 17/30395* (2013.01); *G06F 17/30557* (2013.01)

(58) Field of Classification Search
CPC ............ G06F 17/30395; G06F 17/30557
See application file for complete search history.

(56) References Cited

U.S. PATENT DOCUMENTS

| 5,926,807 A * | 7/1999 | Peltonen ............ G06F 17/30501 |
| 2007/0143261 A1* | 6/2007 | Uppala ............. G06F 17/30445 |
| 2009/0043734 A1* | 2/2009 | Barsness ........... G06F 17/30442 |
| 2010/0011031 A1* | 1/2010 | Huang ................. G06F 21/552 707/E17.007 |
| 2012/0221549 A1* | 8/2012 | Weyerhaeuser .. G06F 17/30463 707/713 |
| 2013/0173569 A1* | 7/2013 | Pearcy ................... G06F 17/30 707/706 |
| 2014/0122530 A1* | 5/2014 | Bhatia ............... G06F 17/30979 707/779 |
| 2017/0228423 A1* | 8/2017 | Bhatia ............... G06F 17/30445 |

* cited by examiner

*Primary Examiner* — Jared M Bibbee
(74) *Attorney, Agent, or Firm* — Mintz Levin Cohn Ferris Glovsky and Popeo, P.C.

(57) ABSTRACT

A database server receives a request to perform a primary query on a table of a database. A first table query can be generated and can include a starting row identifier, ROW A, and a number of rows, n, for generating a data chunk from the table of the database. Multiple table queries can be performed each having a different starting row identifier and each defining the number of rows forming a data chunk. The primary query can be extended with the first table query in preparation for performing the primary query on the first data chunk.

22 Claims, 7 Drawing Sheets

| ROW_ID | FIELD1 | FIELD2 | FIELD 3 | FIELD 4 | FIELD 5 | FIELD 6 | FIELD7 |
|---|---|---|---|---|---|---|---|
| 0001 | | | | | | | |
| 0002 | | | | | | | |
| 0004 | | | | | | | |
| 0006 | | | | | | | |
| 0007 | | | | | | | |
| 0008 | | | | | | | |
| 0009 | | | | | | | |
| ... | | | | | | | |
| ... | | | | | | | |
| ... | | | | | | | |
| 500001 | | | | | | | |
| 500002 | | | | | | | |
| 500003 | | | | | | | |
| 500004 | | | | | | | |

500 ↗
ROW A
ROW B

PROCESSING OF DATA CHUNKS USING A DATABASE CALCULATION ENGINE

TECHNICAL FIELD

The subject matter described herein relates to a database system that incorporates a calculation engine that performs calculation scenarios involving processing of data chunks.

BACKGROUND

The demand for ad-hoc and real-time data analyses by many users simultaneously is increasing in the same way that the data quantities to be processed are increasing. To keep pace with the competition in the current economic climate, it is crucial to have the latest information about processes within an organization (e.g. a company) and/or in the market to be able to make the right decisions promptly.

Large data sets that are to be processed can oftentimes exceed the available memory, preventing the data sets from being completely loaded into the available memory.

SUMMARY

In one aspect, a method to be performed on one or more data processors comprising at least part of a computer system is provided. The method can comprise one or more operations as described herein. A request to perform a primary query on a table of a database can be received at the one or more data processors. A first table query can be generated by the one or more data processors. The first table query can include a first starting row identifier and a first number of rows for generating a first data chunk from the table of the database. The primary query can be extended by the one or more data processors, with the first table query in preparation for performing the primary query on the first data chunk.

In some variations, the operations can include presenting the results of the primary query performed on the first data chunk to one or more users of a database system. One or more further table queries can be generated by the one or more data processors. The further table queries can each include a further starting row identifier and a further number of rows for generating one or more further data chunks from the table of the database. The primary query can be extended, by the one or more data processors, with the further table queries in preparation for performing the primary query on the first data chunk and the one or more further data chunks.

In some variations, the table can comprise rows having a unique row identifier. The unique row identifier can be persistent through the table, the first data chunk and the one or more further data chunks. The selection of the first starting row, the first number of rows, the one or more further starting rows and the one or more further number of rows can be such to ensure that any one row of the table appears in at most one data chunk.

The data in the table of the database can be prevented from being modified during the generation of the first data chunk.

In some variations, the primary query can comprise one or more calculation nodes specifying one or more attributes. The first data chunk can be generated based on the one or more attributes.

In some variations, the size of one or more data chunks of the table of the database can be determined by the one or more data processors. The size of the one or more data chunks can be based on one or more attributes of the primary query. The size of the one or more data chunks can be based on the available memory of the system.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 5 is a conceptual illustration of a table of a database system having one or more features consistent with the present description;

FIGS. 6A-6B are conceptual illustrations of data chunks comprising a number of rows and having separate starting rows, the data chunks having one or more features consistent with the current subject matter; and, FIG. 7 is a process flow diagram illustrating a method having one or more features consistent with the presently described subject matter.

DETAILED DESCRIPTION

Figure 1:
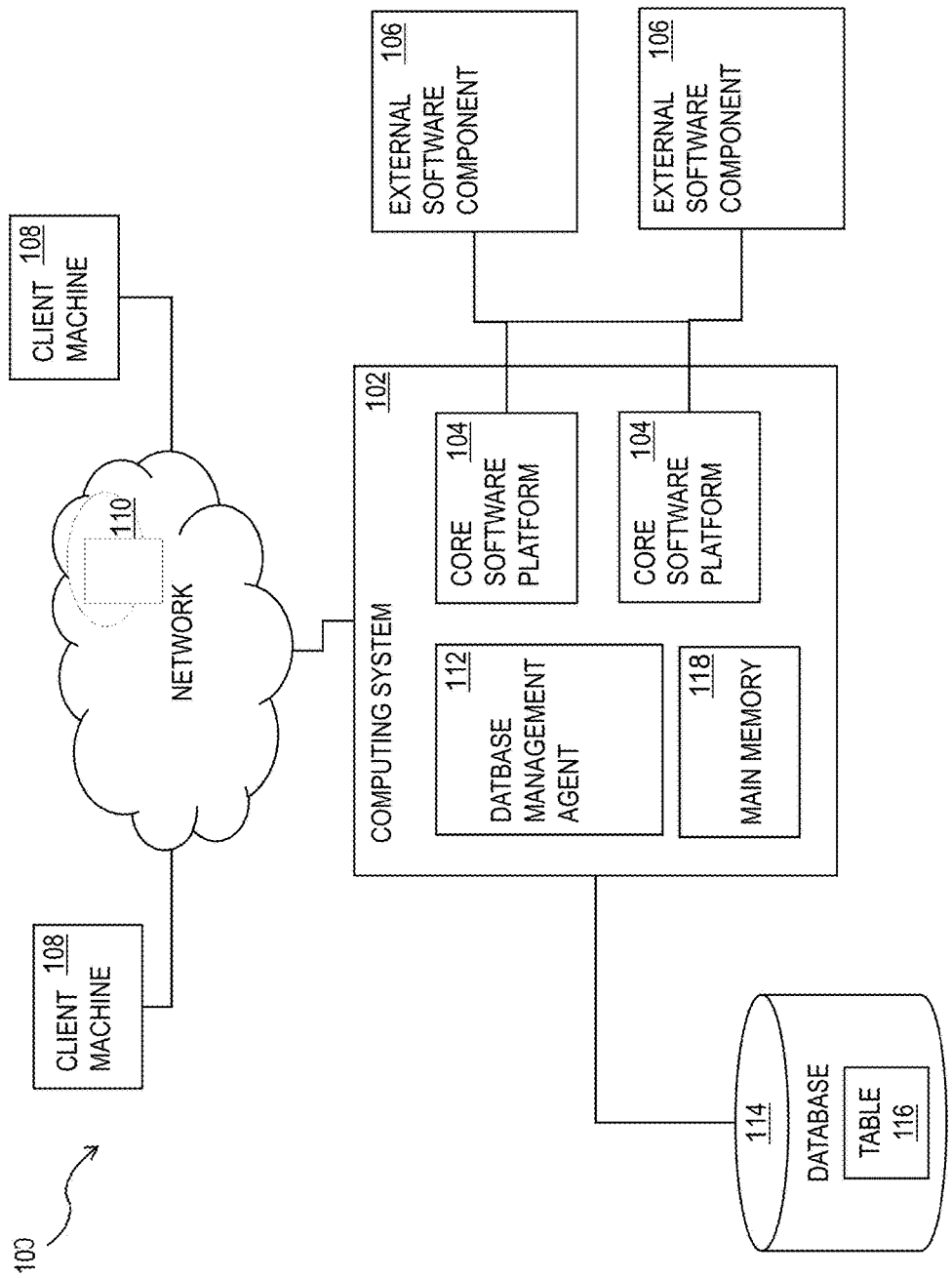
FIG. 1 shows a diagram of a system that can implement one or more features consistent with the current subject matter.

A database system can include multiple tables. A table is a collection of related data held in a structured format within a database. A table typically consists of fields, or columns, and rows. In some variations, the cells of the table may include database commands linking to data that is held externally to the database.

A database system can typically include a database management system. The database management system can comprise multiple layers or levels. The different layers can be configured to perform different types of operations. For example, the lowest layer, or physical layer, of a database management system can be configured to perform the actual operations requested by the users of the database management system. At the physical layer, a conceptual instruction provided by a user may have been translated into many instructions that are readable by the database.

A middle layer, or logical layer, can be configured to consolidate external concepts and instructions into an intermediate data structure. The intermediate data structure can be capable of being devolved into the physical instructions for implementation at the physical layer. The logical layer can be configured to provide execution pathways of operations to multiple different databases and/or database tables, in response to instructions received from the top layer, or view layer.

The view layer can be configured to implement applications that are provided to users of the database management system. Database operations can be represented as database access. In some variations, individual databases within a database system can be viewed as the same at this layer, despite differences in content and operation of those individual databases.

In some variations, the view layer can be a calculation engine layer. The calculation engine layer can be configured to facilitate the processing of user queries and requests using diverse calculation operations. When processing queries, having the tables loaded into the main memory of the database management system increases the efficiency at which the database management system can execute queries, improving the optimization of the database management system.

There may exist database tables that exceed the size limits of the available memory in the main memory of the database management system. Consequently, if the whole table is accessed for a query, the database management system may be required to continually transfer data between the main memory and the disk memory of the database management system. Similarly, a query may be requested by a user that does not require the entire contents of a database table to be loaded into the main memory of the database management system.

The presently described subject matter contemplates dividing the database tables into chunks. Where the whole database table is required for running the query, the database table may be split into multiple chunks. Where the query identifies that only a portion of the database table is needed for running the query, chunks comprising only those needed portions of the database table may be split from the database table.

The individual chunks of data may be processed in parallel or serially. In some variations, the desired calculation may dictate how the chunks are processed by the database management system.

FIG. 1 shows a diagram of a system 100 that can implement one or more features of the current subject matter. A computing system 102 can include one or more core software platform modules 104 providing one or more features of a business software system or other software that includes database management features. The computing system can also aggregate or otherwise provide a gateway via which users can access functionality provided by one or more external software components 106. One or more client machines 108 can access the computing system, either via a direct connection, a local terminal, or over a network 110 (e.g. a local area network, a wide area network, a wireless network, the Internet, or the like).

A database management agent 112 or other comparable functionality can access a database 114 that includes at least one table 116, which can in turn include at least one column. The database management agent 112 can implement one or more of the features of implementations discussed herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like.

The database management agent 112 or other comparable functionality can be configured to load a database table 116, or other comparable data set, into the main memory 118. The database management agent 112 can be configured to load the information from the database 114 to the main memory 118 in response to receipt of a query instantiated by a user or computer system through one or more client machines 108, external software components 106, core software platforms 104, or the like.

Figure 2:
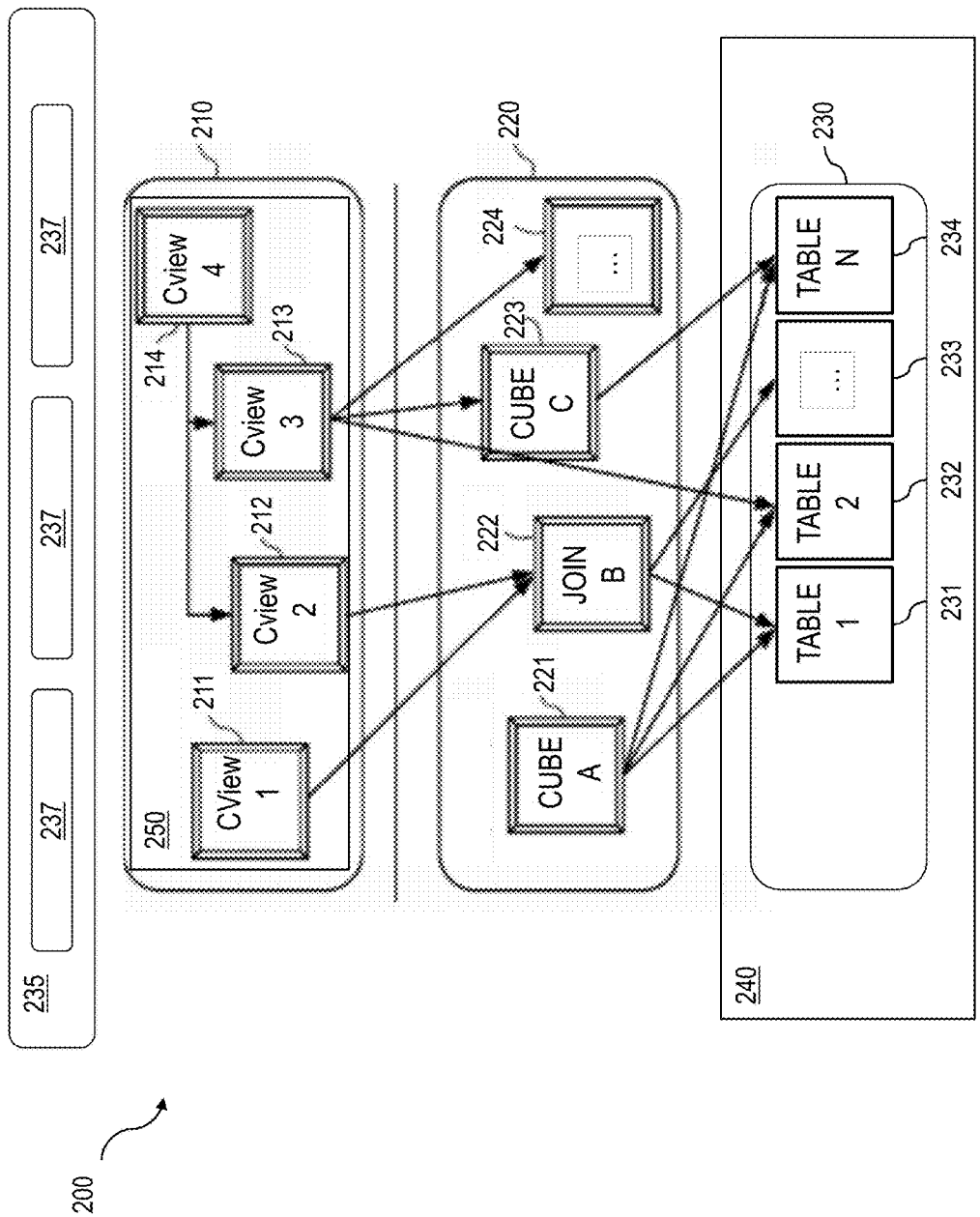
FIG. 2 is a diagram that illustrates a computing architecture having one or more features consistent with the current subject matter.
Figure 3:
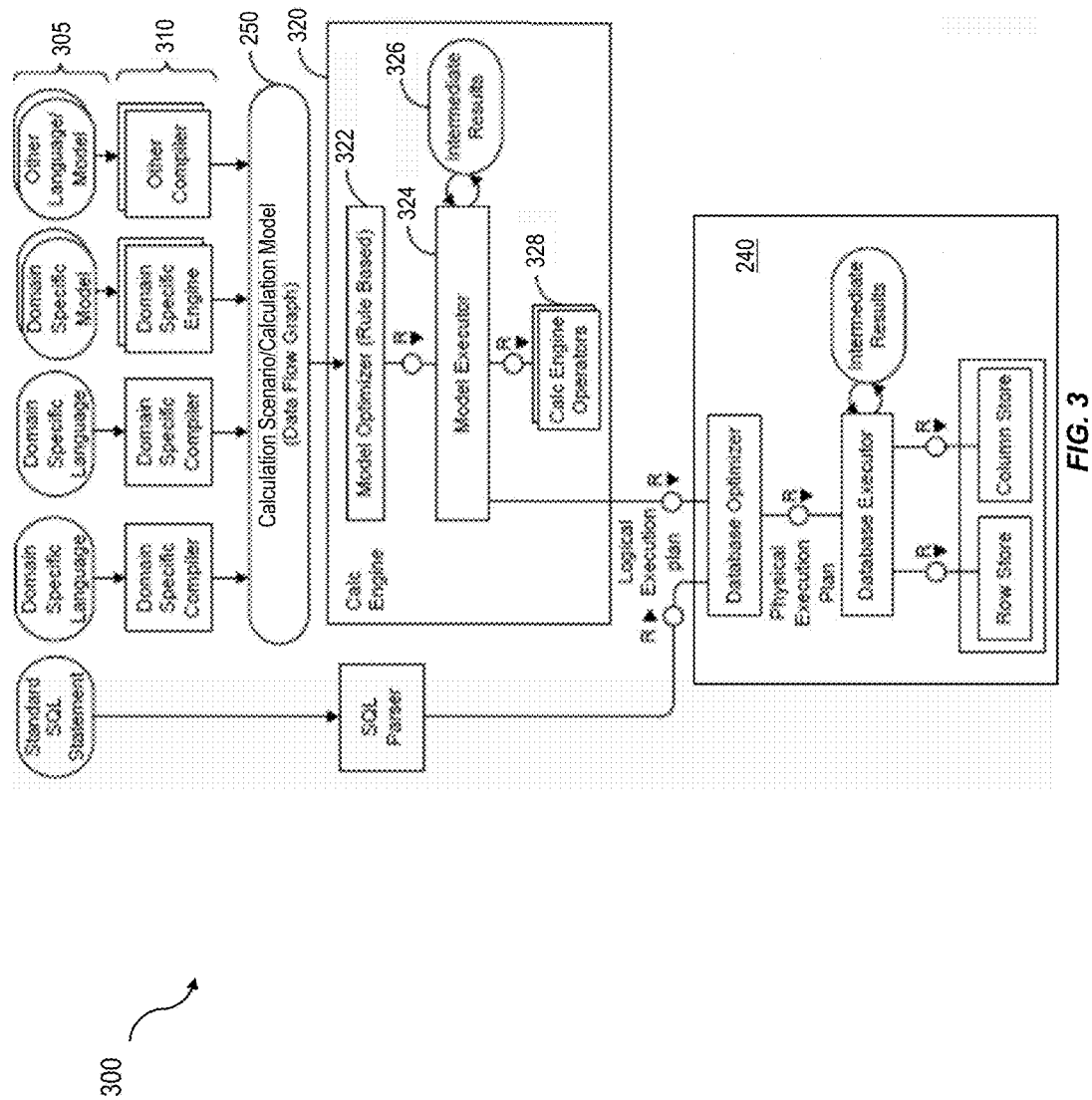
FIG. 3 is a diagram illustrating a sample architecture for request processing and execution control, the sample architecture having one or more features consistent with the current subject matter.

FIG. 2 is a diagram that illustrates a computing architecture 200 including a database system that includes three layers: a top layer, calculation engine layer 210, an intermediate layer, or logical layer 220, and a top layer, or physical table-pool 230. One or more application servers 235 implementing database client applications 237 can access the database system 300, as shown in FIG. 3. Calculation scenarios can be executed by a calculation engine, which can form part of a database or which can be part of the calculation engine layer 210 (which is associated with the database). The calculation engine layer 210 can be based on and/or interact with the other two layers, the logical layer 220 and the physical table pool 230. In some variations, the physical table pool 230 can comprise database operations configured to access and perform the database operations on the individual tables. In some variations, the basis of the physical table pool 230 consists of physical tables (called indexes) containing the data, which can be stored on one or more database servers 240. Various tables 231-234 can be joined using logical metamodels 221-224 defined by the logical layer 220 to form an index. For example, the tables 231-234 in a cube (e.g. an online analytical processing or "OLAP" index) can be assigned roles (e.g., fact or dimension tables) and joined to form a star schema. It is also possible to form join indexes (e.g. join index B 222 in FIG. 2), which can act like database views in computing environments such as the Fast Search Infrastructure (FSI) available from SAP SE of Walldorf, Germany.

A calculation scenario 250 can include individual nodes (e.g. calculation nodes) 211-214, which in turn can each define operations such as joining various physical or logical indexes and other calculation nodes (e.g., CView 4 is a join of CView 2 and CView 3). That is, the input for a node 211-214 can be one or more physical, join, or OLAP indexes or calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

In a calculation scenario 250, two different representations can be provided, including a) a pure calculation scenario in which all possible attributes are given and b) an instantiated model that contains only the attributes requested in the query (and required for further calculations). Thus, calculation scenarios can be created that can be used for various queries. With such an arrangement, a calculation scenario 250 can be created which can be reused by multiple queries even if such queries do not require every attribute specified by the calculation scenario 250. For on-the-fly scenarios this means that the same calculation scenario (e.g., in XML format, etc.) can be used for different queries and sent with the actual query. The benefit is that on application server side the XML description of a calculation scenario can be used for several queries and thus not for each possible query one XML has to be stored.

Every calculation scenario 250 can be uniquely identifiable by a name (e.g., the calculation scenario 250 can be a database object with a unique identifier, etc.). Accordingly, the calculation scenario 250 can be queried in a manner similar to a view in a SQL database. Thus, the query is forwarded to the calculation node 211-214 for the calculation scenario 250 that is marked as the corresponding default node. In addition, a query can be executed on a particular calculation node 211-214 (as specified in the query). Furthermore, nested calculation scenarios can be generated in which one calculation scenario 250 is used as source in another calculation scenario (e.g. via a calculation node 211-214 in this calculation scenario 250). Each calculation node 211-214 can have one or more output tables. One output table can be consumed by several calculation nodes 211-214.

FIG. 3 is a diagram 300 illustrating a sample architecture for request processing and execution control. As shown in FIG. 3, artifacts 305 in different domain specific languages can be translated by their specific compilers 310 into a common representation called a "calculation scenario" 250 (which is also referred to in FIG. 3 as a calculation model). To achieve enhanced performance, the models and programs written in these languages are executed inside the database server 240. This arrangement eliminates the need to transfer large amounts of data between the database server 240 and a client application 237, which can be executed by an application server 235. Once the different artifacts 305 are compiled into this calculation scenario 315, they can be processed and executed in the same manner. A calculation engine 320 executes the calculation scenarios 315.

A calculation scenario 315 can be a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 237 at the application server 235). Inputs can be connected to tables or to the outputs of other nodes. A calculation scenario 315 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 315 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, he or she can use a split. Then, the nodes can be automatically multiplied between split and merge and partition the data.

A calculation scenario 315 can be defined as part of database metadata and invoked multiple times. A calculation scenario 315 can be created, for example, by a SQL statement "CREATE CALCULATION SCENARIO <NAME> USING <XML or JSON>". Once a calculation scenario 315 is created, it can be queried (e.g., "SELECT A, B, C FROM <scenario name>", etc.). In some cases, databases can have pre-defined calculation scenarios 315 (default, previously defined by users, etc.). Calculation scenarios 315 can be persisted in a repository (coupled to the database server 240) or in transient scenarios. Calculation scenarios 315 can also be kept in-memory.

Calculation scenarios 315 are more powerful than traditional SQL queries or SQL views for many reasons. One reason is the possibility to define parameterized calculation schemas that are specialized when the actual query is issued. Unlike a SQL view, a calculation scenario 315 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 315 may contain an aggregation node containing all attributes. Later, the attributes for grouping can be supplied with the query. This allows having a predefined generic aggregation, with the actual aggregation dimensions supplied at invocation time. The calculation engine 320 can use the actual parameters, attribute list, grouping attributes, and the like supplied with the invocation to instantiate a query specific calculation scenario 315. This instantiated calculation scenario 315 is optimized for the actual query and does not contain attributes, nodes or data flows that are not needed for the specific invocation.

When the calculation engine 320 gets a request to execute a calculation scenario 315, it can first optimize the calculation scenario 315 using a rule based model optimizer 322. Examples for optimizations performed by the model optimizer can include "pushing down" filters and projections so that intermediate results 326 are narrowed down earlier, or the combination of multiple aggregation and join operations into one node. The optimized model can then be executed by a calculation engine model executor 324 (a similar or the same model executor can be used by the database directly in some cases). This includes decisions about parallel execution of operations in the calculation scenario 315. The model executor 324 can invoke the required operators (using, for example, a calculation engine operators module 328) and manage intermediate results. Most of the operators are executed directly in the calculation engine 320 (e.g., creating the union of several intermediate results). The remaining nodes of the calculation scenario 315 (not implemented in the calculation engine 320) can be transformed by the model executor 324 into a set of logical database execution plans.

Multiple set operation nodes can be combined into one logical database execution plan if possible.

The calculation scenarios 315 of the calculation engine 320 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 320 to execute the calculation scenario 315 behind the calculation view. In some implementations, the calculation engine 320 and the SQL processor are calling each other: on one hand the calculation engine 320 invokes the SQL processor for executing set operations and SQL nodes and, on the other hand, the SQL processor invokes the calculation engine 320 when executing SQL queries with calculation views.

Figure 4:
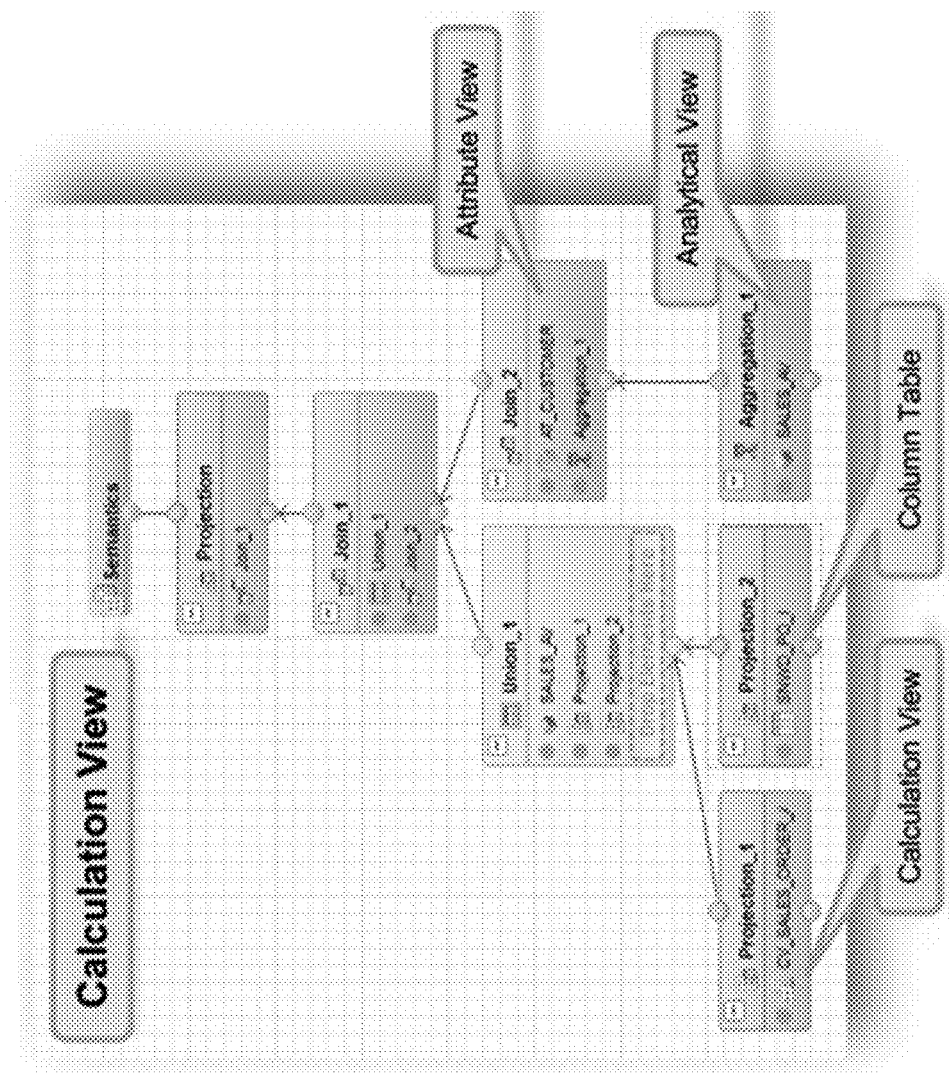
FIG. 4 is an illustration of an exemplary graphical calculation view having one or more features consistent with the current subject matter.

FIG. 4 is an illustration of an exemplary graphical calculation view 400 having one or more features consistent with the current subject matter. The graphical calculation view 400 is an example of a calculation view that can be presented to a user of the database management system. The calculation view can also be presented to a user in a scripted fashion. For example, an SQL script representing the calculation view can be presented to the user.

The model optimizer 322 can be configured to enable dynamic partitioning based on one or more aspects of a query and/or datasets used by queries. The model optimizer can implement a series of rules that are triggered based on attributes of incoming datasets exceeding specified thresholds. Such rules can, for example, apply thresholds each with a corresponding a parallelization factor. For example, if the incoming dataset has 1 million rows then two partitions (e.g., parallel jobs, etc.) can be implemented, or if the incoming dataset has five million rows then five partitions (e.g., parallel jobs, etc.) can be implemented, and the like.

The attributes of the incoming datasets utilized by the rules of model optimizer 322 can additionally or alternatively be based on an estimated and/or actual amount of memory consumed by the dataset, a number of rows and/or columns in the dataset, and the number of cell values for the dataset, and the like.

A calculation scenario 315 as described herein can include a type of node referred to herein as a semantic node (or sometimes semantic root node). A database modeler can flag the root node (output) in a graphical calculation view to which the queries of the database applications directed as semantic node. This arrangement allows the calculation engine 320 to easily identify those queries and to thereby provide a proper handling of the query in all cases.

To process queries submitted through the calculation engine layer 210 using a calculation scenarios 250, the physical layer 230 may be required to load one or more tables 231-234 into the main memory 118 of the computing system 102. There may be occasion where there is insufficient capacity to load one of the tables, in its entirety, into the memory. Not having the whole table in the main memory 118 can create a situation here the computing system 102 has to continually communicate with disk memory on which a copy of the table may be stored. This increases the processing time of the executed calculation scenario 250.

Similarly, the calculation nodes 211-214 may include one or more constraints that narrow the part of the table that needs to be processed. The constraints may result in a subset of the rows of a table that require processing. Consequently, there would be no need to load every row of the table into the main memory 118 of the computing system 102.

Figure 7:
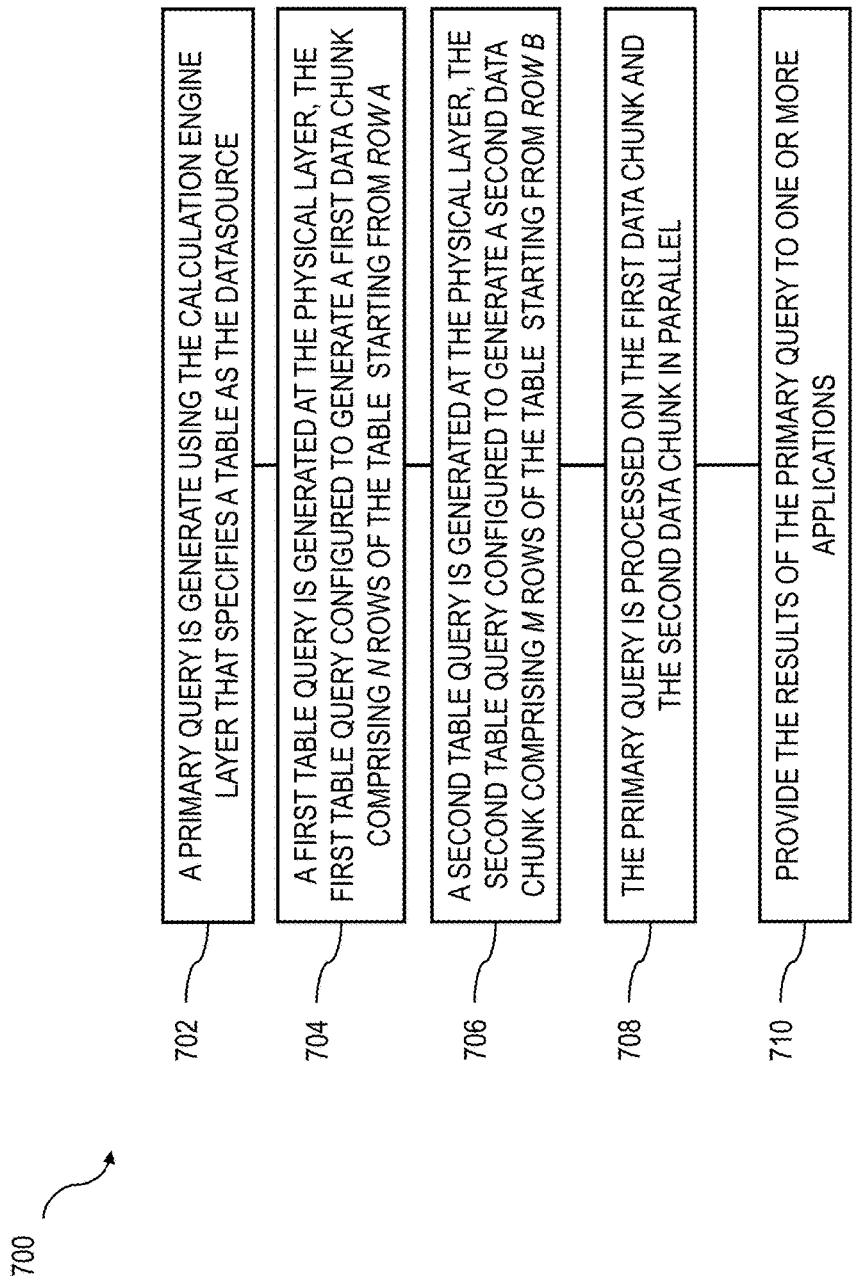

FIG. 7 is a process flow diagram 700 illustrating a method having one or more features consistent with the presently described subject matter. At 702, a primary query can be generated using the calculation engine layer 210. The primary query can define a calculation scenario 250 that includes one or more calculation nodes 211-214. The calculation nodes can specify a plurality of attributes. The primary query can require a request of a subset of the attributes specified by a top operator node. In some variations, the top operator node can be parameterized by setting a number of lines that should be returned and defining a number of base attributes with a sort direction. The sort can be performed and the number of defined lines can be returned. Additionally, a special top attribute can be defined that allows getting the top number of lines for each group of this attribute. The operation is expected to return, e.g., the top K of products ordered by region. The base attributes may be static, such that individual attributes provide independent filters, or dynamic, where individual attributes provide filters that are dynamically combined.

The computing system 102 configured to facilitate execution of the primary query can be configured to instantiate an optimized calculation scenario 250 so that the calculation scenario 250 optimizes the calculation scenario by requesting only the subset of attributes. One or more of the calculation nodes 211-214 can refer to one or more tables in a database.

At 704, a first table query can be generated. The first table query can be configured to generate a first data chunk, which includes a first set of rows of the table. The first table query can facilitate generating the first data chunk by specifying one or more constraints on a table in the database. The one or more constraints can specify a starting row identity, ROW A, as well as a number of rows n. The first table query can be configured to generate the first data chunk to include n rows from the table starting with the ROW A.

Figures 6A, 6B:
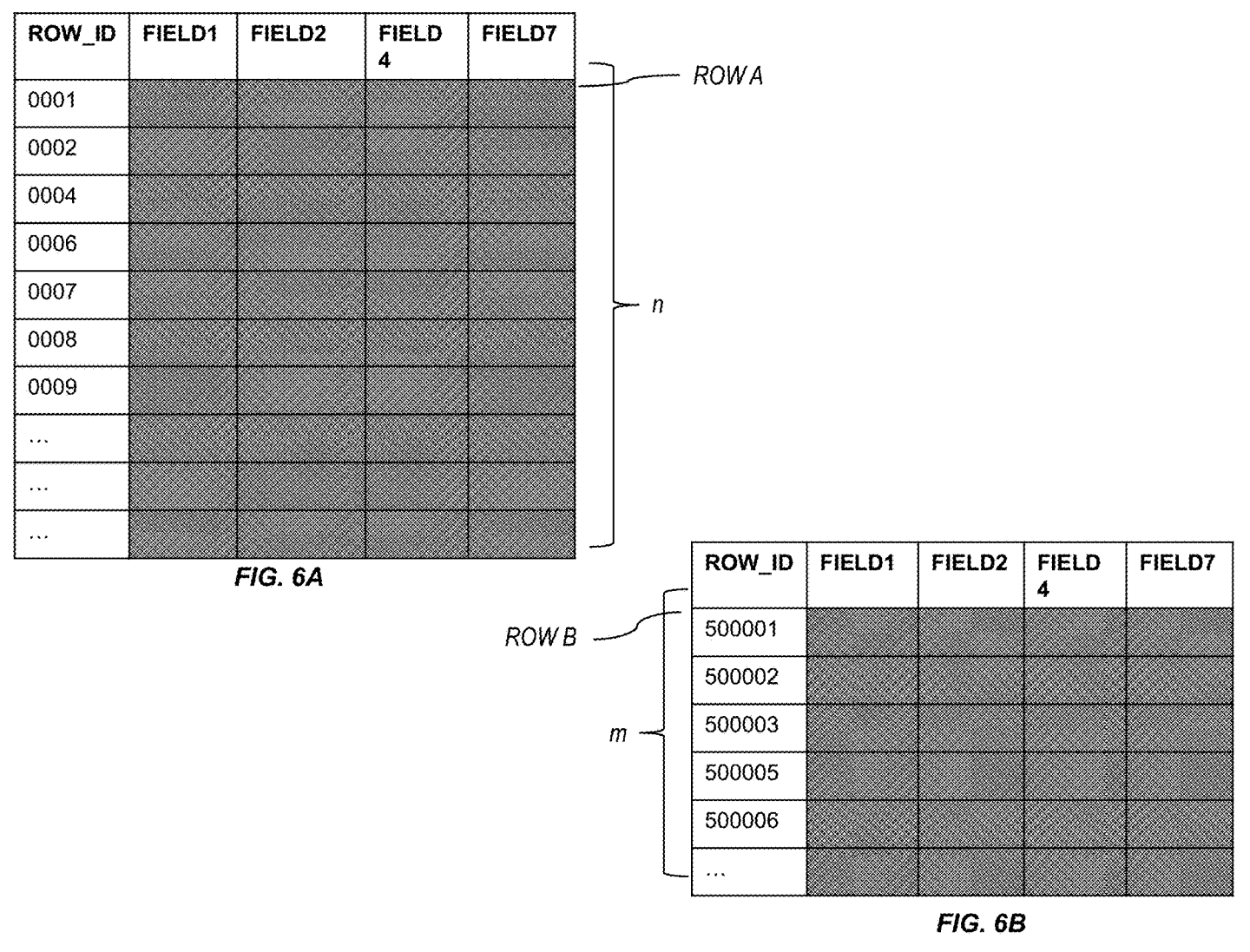

FIG. 5 is a conceptual illustration of a table 500 of a database system having one or more features consistent with the present description. As an example, the first table query can be configured to generate a first data chunk comprising n rows of table 500 starting at ROW A. FIG. 6A is a conceptual illustration of a first data chunk comprising n rows of table 500 starting at ROW A. One or more constraints in the primary query can provide filters. The filters can negate the necessity to process one or more fields and/or rows of the table. For example, the first data chunk illustrated in FIG. 6A comprises a subset of fields of the fields contained in table 500 as illustrated in FIG. 5.

The filters provided in the constraints of the primary query can facilitate determination of the size of the data chunks. The query engine, configured to instantiate the query, may be configured to recognize whole tables, and not data chunks of those tables. Consequently, the filters that cause the specification of the data chunks are translated from operators at the calculation level to machine commands at the physical level. This facilitates guaranteeing of the generation of the data chunks as specified by the filters at the calculation level.

In some variations, at 706, a second table query can be generated. The second table query can be configured to generate a second data chunk, which includes a second set of rows of the table. The second table query can facilitate generating the second data chunk by specifying one or more constraints on a table in the database. The one or more constraints can specify a starting row identity, ROW B. The one or more constraints can specify a number of rows m. The second table query can be configured to generate the second data chunk to include m rows from the table starting with the ROW B.

As an example, the second table query can be configured to generate a second data chunk comprising m rows of table 500 starting at ROW B. FIG. 6B is a conceptual illustration of a second data chunk comprising m rows of table 500 starting at ROW B. As with the first data chink, one or more constraints in the primary query can provide filters that negate the necessity to process one or more fields and/or rows of the table. For example, in the second data chunk illustrated in FIG. 6B, one or more rows between ROW B and the mth row of table 500 are not included in the second data chunk.

In some variations, additional data chunks can be generated in a similar manner. In some applications, the number of rows in one or more of the data chunks can be different. In other applications, the number of rows in the data chunks can be the same.

In some variations, the table queries can be generated at the physical layer 230. Generating the table queries at the physical layer 230 can ensure that the table queries are operating on the table, rather than being abstracted by the intermediate or application layers. In other words, it can be advantageous to define the offset and chunk size at the calculation engine layer, and translate the offset and chunk size to the physical table level, rather than in fixed SQL statements.

The rows of a data chunk can be all consecutive rows between the row with the starting row identity to the nth row from the starting row. The rows of a data chunk can include rows of table 500 starting with the row with the starting row identity and including n non-excluded rows from the starting row. Rows can be excluded by constraints imposed by the primary query. Excluded rows can include rows that, based on the constraints of the primary query, could not possibly satisfy the query.

The size of the data chunks can be based on the amount of available memory in the main memory 118 of the computing system 102. The amount of available memory can be static. The amount of available memory can be dynamic. For example, the computing system 102 can, at times, be under heavy load. In such situations, the available memory in the main memory 118 for running a query may be limited. Consequently, the size of the data chunks may, themselves, be limited by the amount of the available memory in the main memory 118. In some variations, the size of the data chunks may be based on the query type or application from which the query has been instantiated.

At 708, the primary query can be processed on the one or more data chunks. The primary query can be processed on multiple data chunks. Any number of data chunks can be generated. Multiple data chunks can be processed in parallel, for example, a first data chunk and a second data chunk may be performed in parallel. As used herein, "first data chunk" and "second data chunk" is used to distinguish between two different data chunks. The first data chunk need not be the first data chunk in a set of a plurality of data chunks generated from a table. Similarly, the second data chunk need not be a data chunk consecutively positioned with the first data chunk. The second data chunk could be a data chunk appearing before or after the first data chunk. The distinguishing factor being that the first data chunk and the second data chunk are different data chunks.

Parallel processing of the multiple data chunks can be performed by alternating calls between the different ones of the multiple data chunks until the data chunks have been processed. Parallel processing of different ones of the multiple data chunks can be performed by different sets of central processing unit (CPU) cores. For example, parallel processing of a first data chunk and a second data chunk can be performed by a first set of CPU cores processing the first data chunk while a second set of CPU cores process the second data chunk. Memory assigned for processing the primary query can be so divided to facilitate parallel processing of the multiple data chunks.

At 710, the results of the primary query can be provided from the database management agent 112 to one or more applications, such as a core software platform 104, external software component 106, client machine 108, and the like.

In some applications, the multiple data chunks can be processed in series. This can be especially so when the available amount of main memory 118 is limited to a certain amount. Once the first data chunk has been processed the second data chunk can be processed.

In order to ensure that the rest of the calculation nodes 211-214 of the primary query can operate on the data chunks of a table, such as table 500, it is necessary to ensure that the row identity of each row is maintained. The row identity of each row is unique and can be configured to be persistent across all tables of a database system and/or across all data chunks generated from a table of the database system. Similarly, it is necessary to ensure that any row in one data chunk is not repeated in another data chunk. For example, if a single row appears in multiple data chunks, the situation may arise where the result of the query may cumulatively include the information from each occurrence of that single row.

In some variations, the calculation nodes of the primary query can be processed individually for each of the generated data chunks within one transaction to guarantee that the row identity of each row is maintained.

In some cases where a table, such as table 500, is split, data can become lost, deleted and/or modified. A scenario modeler may be configured to prevent data being lost, deleted and/or modified.

In some applications, table queries can be configured to be generated in response to the primary query that includes a top operator node of the calculation nodes specifying a single table as the source of the data for the query.

Without in any way limiting the scope, interpretation, or application of the claims appearing herein, a technical effect of one or more of the example embodiments disclosed herein may include providing an operation that may read data from a data table in data chunks. This may speed up the data processing when (i) only a partial amount of data from the table is required, (ii) where the amount of available main memory is insufficient to load the entire table, such as in big data applications, (iii) to process multiple chunks in parallel, and the like. The presently described subject matter may increase the efficiency of the database management system, reducing processing times, energy costs, database management system cooling costs, and the like.

Without in any way limiting the scope, interpretation, or application of the claims appearing herein, a technical effect of one or more of the example embodiments disclosed herein may include handling of the database demands of an enterprise resource planning (ERP) system, other business software architecture, or other data-intensive computing application or software architecture. Such applications can, in some examples, be provided as a standalone, customized software installation that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method to be performed on one or more data processors comprising at least part of a computer system, the method comprising:

receiving, at the one or more data processors, a request to perform a primary query on a table stored in a database;

determining, in response to the request, that the table exceeds a size limit of a main memory of a database management system associated with the database; and in response to the determination that the table exceeds the size limit of the main memory of the database management system, generating, by the one or more data processors, a first table query and a second table query, the first table query defining, based at least on a first starting row identifier and a first number of rows, a first data chunk from the table of the database, and the second table query defining, based at least on a second starting row identifier and a second number of rows, a second data chunk from the table of the database, executing the first table query to at least load, into the main memory, the first data chunk, performing the primary query on the first data chunk in the main memory, the primary query being performed on the first data chunk prior to executing the second table query to at least load, into the main memory, the second data chunk and performing the primary query on the second data chunk in the main memory, the loading of the second data chunk into the main memory overwriting the first data chunk in the main memory, and in response to the table including additional data in excess of the first data chunk and the second data chunk, generating and executing a third table query to at least load, into the main memory, a third data chunk including the additional data, and executing the primary query on the third data chunk in the main memory.

2. The method of claim 1, further comprising:
presenting, to one or more clients of the database management system, a result of the primary query being performed on the first data chunk and/or the second data chunk.

3. The method of claim 1, wherein the response to the determination that the table exceeds the size limit of the main memory of the database management system further comprises:
upon executing the primary query on the first data chunk in the main memory, executing the second table query to at least load, into the main memory, the second data chunk; and
performing the primary query the second data chunk in the main memory.

4. The method of claim 3, wherein the table comprises a plurality of rows, and wherein each of the plurality of rows is associated with a unique row identifier.

5. The method of claim 3, wherein the first starting row, the first number of rows, the second starting row, and the second number of rows are selected to ensure that the first data chunk and the second data chunk include different rows from the table.

6. The method of claim 1, further comprising:
preventing, by the one or more data processors, data in the table of the database from being modified during the execution of the first table query to load the first data chunk into the main memory.

7. The method of claim 3, wherein the primary query defines a calculation scenario that comprises one or more calculation nodes, wherein the one or more calculation scenario specifies a plurality of attributes, and wherein the primary query require a subset of the plurality of attributes comprising the first data chunk and/or the second data chunk.

8. The method of claim 7, further comprising:
determining, by the one or more data processors, a size of the first data chunk and/or the second data chunk.

9. The method of claim 8, wherein the size of the first data chunk and/or the second data chunk is determined based on the subset of the plurality of attributes.

10. The method of claim 9, wherein determining the size of the first data chunk and/or the second data chunk is further determined based on the size limit of the main memory of the database management system.

11. A system comprising:
at least one data processor; and,
a memory coupled to the at least one data processor, the memory storing instructions, which, when executed, cause the at least one data processor to perform operations comprising:
receiving, at the one or more data processors, a request to perform a primary query on a table stored in a database;
determining, in response to the request, that the table exceeds a size limit of a main memory of a database management system associated with the database; and in response to the determination that the table exceeds the size limit of the main memory of the database management system,
generating, by the one or more data processors, a first table query and a second table query, the first table query defining, based at least on a first starting row identifier and a first number of rows, a first data chunk from the table of the database, and the second table query defining, based at least on a second starting row identifier and a second number of rows, a second data chunk from the table of the database,
executing the first table query to at least load, into the main memory, the first data chunk,
performing the primary query on the first data chunk in the main memory, the primary query being performed on the first data chunk prior to executing the second table query to at least load, into the main memory, the second data chunk and performing the primary query on the second data chunk in the main memory, the loading of the second data chunk into the main memory overwriting the first data chunk in the main memory, and
in response to the table including additional data in excess of the first data chunk and the second data chunk, generating and executing a third table query to at least load, into the main memory, a third data chunk including the additional data, and executing the primary query on the third data chunk in the main memory.

12. The system of claim 11, wherein the operations further comprise:
presenting, to one or more clients of the database management system, a result of the primary query being performed on the first data chunk and/or the second data chunk.

13. The system of claim 11, wherein the response to the determination that the table exceeds the size limit of the main memory of the database management system further comprises:
upon executing the primary query on the first data chunk in the main memory, executing the second table query to at least load, into the main memory, the second data chunk; and
performing the primary query the second data chunk in the main memory.

14. The system of claim 13, wherein the table comprises a plurality of rows, and wherein each of the plurality of rows is associated with a unique row identifier.

15. The system of claim 13, wherein the first starting row, the first number of rows, the second starting row, and the second number of rows are selected to ensure that the first data chunk and the second data chunk include different rows from the table.

16. The system of claim 11, wherein the operations further comprise:
preventing, by the one or more data processors, data in the table of the database from being modified during the execution of the first table query to load the first data chunk into the main memory.

17. The system of claim 13, wherein the primary query defines a calculation scenario that comprises one or more calculation nodes, wherein the one or more calculation scenario specifies a plurality of attributes, and wherein the primary query require a subset of the plurality of attributes comprising the first data chunk and/or the second data chunk.

18. The system of claim 17, wherein the operations further comprise:
   determining, by the one or more data processors, a size of the first data chunk and/or the second data chunk.

19. The system of claim 18, wherein the size of the first data chunk and/or the second data chunk is determined based on the subset of the plurality of attributes.

20. The system of claim 19, wherein determining the size of the first data chunk and/or the second data chunk is further determined based on the size limit of the main memory of the database management system.

21. The method of claim 1, further comprising:
   determining, in response to the request, that the table includes data not required by the primary query; and
   in response to the determination that the table includes data not required by the primary query, preventing a fourth data chunk from being loaded into the main memory of the database management system, the fourth data chunk including the data not required by the primary query.

22. A non-transitory computer-readable medium storing instructions, which when executed by at least one data processor, result in operations comprising:
   receiving, at the one or more data processors, a request to perform a primary query on a table stored in a database;
   determining, in response to the request, that the table exceeds a size limit of a main memory of a database management system associated with the database; and
   in response to the determination that the table exceeds the size limit of the main memory of the database management system,
   generating, by the one or more data processors, a first table query and a second table query, the first table query defining, based at least on a first starting row identifier and a first number of rows, a first data chunk from the table of the database, and the second table query defining, based at least on a second starting row identifier and a second number of rows, a second data chunk from the table of the database,
   executing the first table query to at least load, into the main memory, the first data chunk,
   performing the primary query on the first data chunk in the main memory, the primary query being performed on the first data chunk prior to executing the second table query to at least load, into the main memory, the second data chunk and performing the primary query on the second data chunk in the main memory, the loading of the second data chunk into the main memory overwriting the first data chunk in the main memory, and
   in response to the table including additional data in excess of the first data chunk and the second data chunk, generating and executing a third table query to at least load, into the main memory, a third data chunk including the additional data, and executing the primary query on the third data chunk in the main memory.

* * * * *